United States Patent
Goda

(10) Patent No.: US 11,106,797 B2
(45) Date of Patent: Aug. 31, 2021

(54) DATA PROCESSING APPARATUS, IMAGE PROCESSING APPARATUS AND METHOD FOR VERIFYING AND RESTORING OPERATING SYSTEM IN ACTIVATION MODE

(71) Applicant: CANON KABUSHIKI KAISHA, Tokyo (JP)

(72) Inventor: Keigo Goda, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/577,521

(22) Filed: Sep. 20, 2019

(65) Prior Publication Data
US 2020/0097660 A1    Mar. 26, 2020

(30) Foreign Application Priority Data
Sep. 26, 2018   (JP) .............................. JP2018-180330

(51) Int. Cl.
| | |
|---|---|
| *G06F 21/57* | (2013.01) |
| *H04N 1/00* | (2006.01) |
| *G06F 8/65* | (2018.01) |
| *G06F 9/4401* | (2018.01) |
| *H04N 1/333* | (2006.01) |

(52) U.S. Cl.
CPC .............. *G06F 21/572* (2013.01); *G06F 8/65* (2013.01); *H04N 1/00938* (2013.01); *G06F 9/4406* (2013.01); *G06F 2221/033* (2013.01); *H04N 1/00962* (2013.01); *H04N 1/33369* (2013.01)

(58) Field of Classification Search
None
See application file for complete search history.

(56) References Cited

U.S. PATENT DOCUMENTS

| | | | |
|---|---|---|---|
| 6,795,912 B1* | 9/2004 | Itoh ........................ | G06F 9/441 709/221 |
| 2002/0029301 A1* | 3/2002 | Toda ...................... | G06F 9/5077 719/319 |
| 2004/0126268 A1* | 7/2004 | Ogawa .................. | B32B 15/013 420/557 |
| 2005/0216722 A1* | 9/2005 | Kim ........................ | G06F 9/441 713/2 |
| 2009/0126268 A1* | 5/2009 | Van Duijn ............. | A01G 31/00 47/62 R |

(Continued)

FOREIGN PATENT DOCUMENTS

JP        2016-53839 A    4/2016

*Primary Examiner* — Haris Sabah
(74) *Attorney, Agent, or Firm* — Canon U.S.A., Inc. I.P. Division

(57) ABSTRACT

Provided is a data processing apparatus including: a storage unit that stores a first operating system (OS), a first application program executed after the first OS, a second OS, and a second application program executed after the second OS; and at least one processor configured to, in a first activation mode, verify the first OS, execute the first OS, and then execute the first application program, and, in a second activation mode, verify the second OS, execute the second OS, and then execute the second application program, in which the at least one processor is further configured to restore the first OS, in a case where it is determined on the verification of the first OS that the first OS is not valid, with use of the second OS.

17 Claims, 12 Drawing Sheets

(56) References Cited

U.S. PATENT DOCUMENTS

| | | | |
|---|---|---|---|
| 2010/0214586 A1* | 8/2010 | Suzuki | G06F 9/441 358/1.13 |
| 2010/0325405 A1* | 12/2010 | Laue | G06F 9/441 713/2 |
| 2012/0044534 A1* | 2/2012 | Ichikawa | G06F 3/1225 358/1.15 |
| 2014/0078531 A1* | 3/2014 | Park | G06F 3/1221 358/1.13 |
| 2014/0122902 A1* | 5/2014 | Isozaki | G06F 12/1433 713/193 |
| 2014/0298026 A1* | 10/2014 | Isozaki | G06F 21/53 713/171 |

* cited by examiner

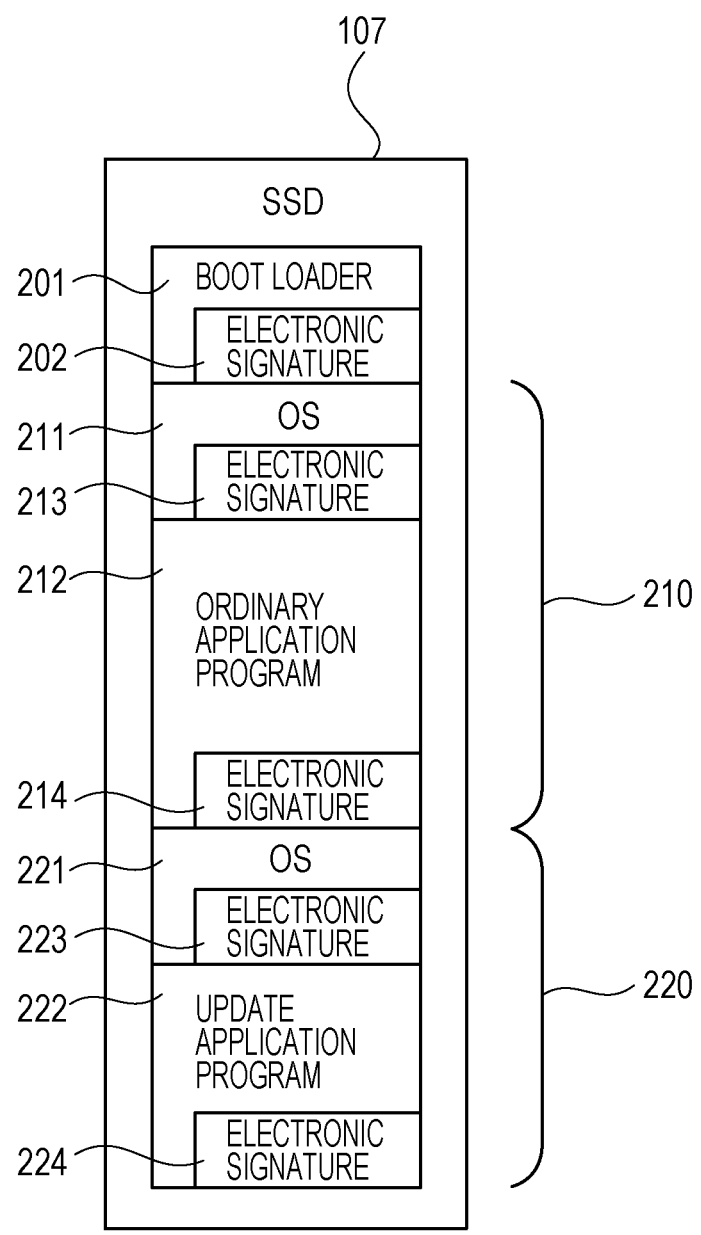

DATA PROCESSING APPARATUS, IMAGE PROCESSING APPARATUS AND METHOD FOR VERIFYING AND RESTORING OPERATING SYSTEM IN ACTIVATION MODE

BACKGROUND

Field of the Disclosure

The present disclosure relates to an image processing apparatus, an information processing method, and a program.

Description of the Related Art

In recent years, a risk that an apparatus with embedded firmware, such as an image forming apparatus, is attacked by an attacker via tampering of the firmware has been increasing. Therefore, one of recent image forming apparatuses includes a function of verifying validity of firmware at a time of activation and causing the image forming apparatus not to operate in a case where it is determined that the firmware is not valid. It is difficult to use such an image forming apparatus, until the firmware is recovered to the normal state by repair or the like.

However, for a user of the image forming apparatus, occurrence of downtime during which the image forming apparatus is difficult to use causes a loss regardless of whether or not a cause is tampering of the firmware. In order to reduce the downtime of the apparatus to reduce disadvantage of the user, it is desired that the image forming apparatus includes a function of restoring and recovering the firmware.

As a conventional technique of restoring firmware, there has been a technique of recovery from a state where firmware is not able to be normally updated due to disorder caused in the middle of firmware update. Japanese Patent Laid-Open No. 2016-53839 discloses a technique in which two pieces of firmware of ordinary firmware and update firmware are provided in an apparatus. In the technique, firmware update is executed in a process that the update firmware is activated first to update the ordinary firmware and the ordinary firmware is then activated to update the update firmware. Thereby, even when abnormality occurs during a firmware update operation, since the firmware which is not a target of the update is normal at a time of occurrence of the abnormality, a recovering operation is able to be executed by executing the normal firmware.

SUMMARY

The disclosure discloses the following: an image processing apparatus that processes an image includes: a first verification unit configured to verify validity of a common part that is included in firmware to be activated among a plurality of pieces of firmware; and a restoration unit configured to restore, in a case where the common part that is included in the firmware to be activated is verified as not being valid by the first verification unit, the common part that is included in the firmware to be activated, with use of a common part that is included in firmware not to be activated among the plurality of pieces of firmware.

Further features of the present disclosure will become apparent from the following description of exemplary embodiments with reference to the attached drawings.

BRIEF DESCRIPTION OF THE DRAWINGS

FIG. 2 is a view illustrating a configuration of firmware of the image forming apparatus.

DESCRIPTION OF THE EMBODIMENTS

Since tampering of firmware is not always performed during a firmware update operation, a technique of recovery from occurrence of abnormality during firmware update is not necessarily useful for preventing tampering of firmware.

In order to minimize downtime caused by tampering of firmware, it is desired that, in a case where tampering is detected when an image forming apparatus is activated, firmware is automatically restored and, without a special operation performed by a user, the image forming apparatus is recovered to a state of usability.

At this time, firmware in a normal state of not being tampered with is necessary for recovering firmware. In order to perform recovery in a short time, it is necessary to keep firmware, which is used for recovery and is in the normal state, in the apparatus in advance.

However, in a recent high-performance image forming apparatus, firmware increases in size, so that a nonvolatile storage medium with large capacity is required for keeping the firmware which is in the normal state, resulting in an increase in cost of the product.

Also in an image forming apparatus, ordinary firmware and update firmware are generally separate pieces of firmware, which have different functions, due to a restriction as to cost. The ordinary firmware includes a program that provides all functions of the image forming apparatus and a program that is related to update and restoration of the firmware. However, the update firmware is configured to include only a minimum function related to update and restoration of the firmware to thereby save a firmware size. Cost of a storage medium that stores the firmware is generally suppressed in this manner.

On the other hand, image forming apparatus firmware includes an OS that is a special program by which, for example, control of hardware is performed. The OS is a special program that is able to cause the image forming apparatus to perform any operation, and, when the OS is tampered, the image forming apparatus is taken over by an attacker. Since the OS is a program with such characteristics, the OS included in the firmware of the image forming apparatus is likely to be an attack target of tampering of firmware by an attacker.

As to such a portion in the firmware, which is particularly likely to be an attack target, it can be said that there is great necessity for a firmware restoration unit in terms of reduction of downtime of an apparatus.

Embodiments of the disclosure will be described below with reference to drawings.

First Embodiment

Figure 1:
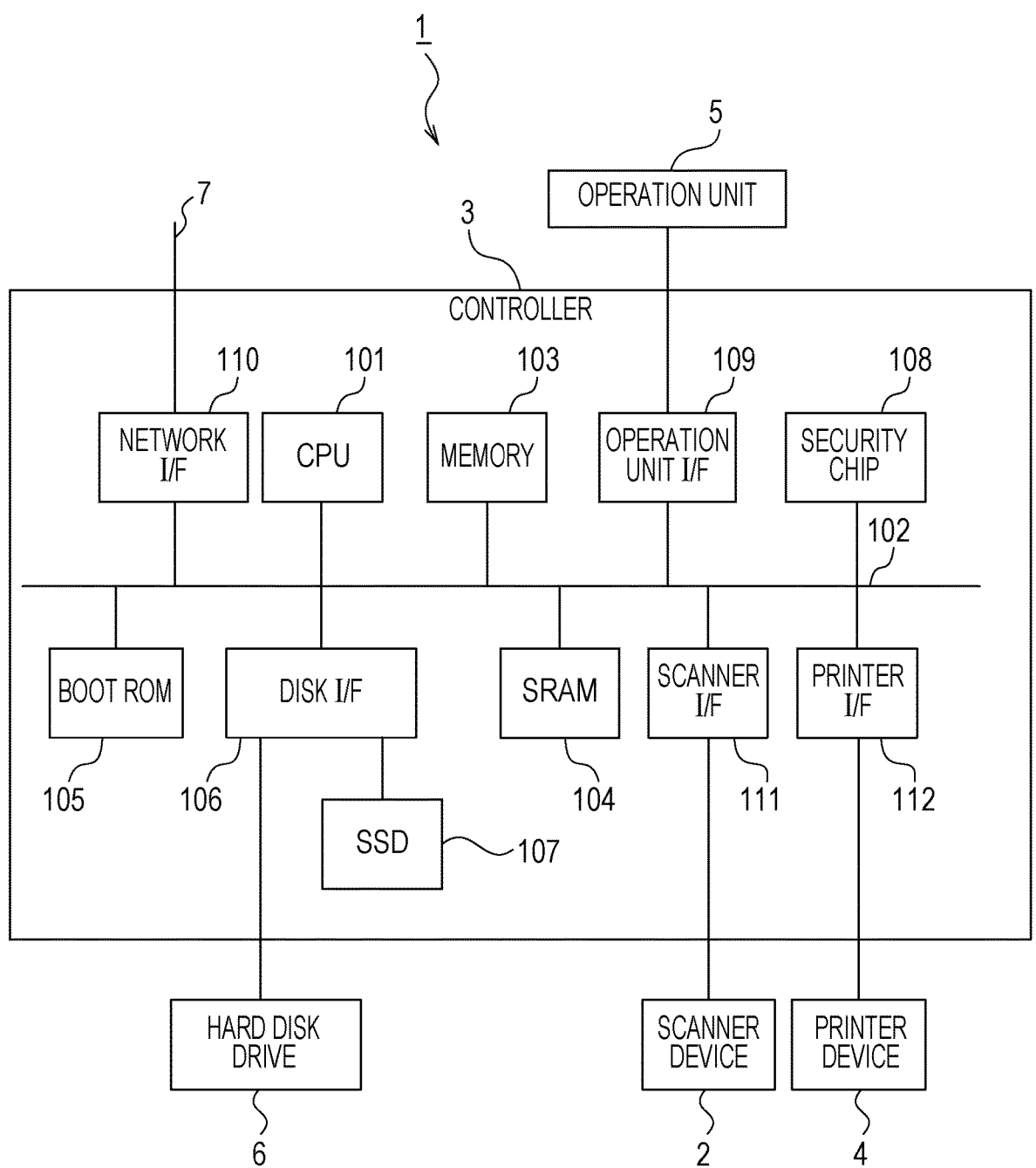
FIG. 1 is a view illustrating an example of a hardware configuration of an image forming apparatus.

FIG. 1 is a view illustrating an example of a hardware configuration of an image forming apparatus 1. The image forming apparatus 1 is an example of an image processing apparatus that processes an image.

The image forming apparatus 1 includes hardware described below.

A scanner device 2 optically reads an image from an original document and performs conversion into a digital image. A printer device 4 outputs the digital image on a sheet of paper. An operation unit 5 is to perform an operation of the image forming apparatus 1. A hard disk drive 6 stores a digital image and various kinds of temporary data. A controller 3 is connected to such hardware, and gives an instruction to each module. Thus, a job can be executed on the image forming apparatus 1.

The image forming apparatus 1 is also able to, for example, input/output a digital image, issue a job, and give an instruction of equipment from an external computer via a LAN 7.

The operation unit 5 includes an operation button and a display panel such as a liquid crystal screen, which are used by a user to give an instruction of an operation such as image copying to the image forming apparatus 1 or used to present various kinds of information of the image forming apparatus 1 to the user.

The controller 3 can be a general-purpose CPU system. A CPU 101 controls an entirety of a board. A memory 103 is used as a main memory by the CPU 101. An SRAM 104 is a nonvolatile memory. A boot ROM 105 is a read-only memory which is non-rewritable, and stores therein an initialization program that is called BIOS. These components are connected via an internal bus 102.

In addition thereto, a disk interface (I/F) 106 that controls a storage device is connected to the internal bus 102. The CPU 101 is able to control an SSD 107 and the hard disk drive 6 through the disk I/F 106. The SSD 107 stores therein firmware that is executed by the CPU 101 to cause the image forming apparatus 1 to operate. Moreover, the controller 3 includes a security chip 108 that has a function of verifying the validity of the firmware.

In addition, to the controller 3, the operation unit 5 is connected via an operation unit interface (I/F) 109 and the LAN 7 is connected via a network interface (I/F) 110. Further, to the controller 3, the scanner device 2 is connected via a scanner interface (I/F) 111 and the printer device 4 is connected via a printer interface (I/F) 112.

FIG. 2 is a view illustrating a configuration of the firmware of the image forming apparatus 1, which is stored in the SSD 107.

The SSD 107 stores therein three types of executable programs which include a boot loader 201, ordinary firmware 210, and update firmware 220. The ordinary firmware 210 and the update firmware 220 are examples of a plurality of pieces of firmware. Although description will be given in the embodiment below by taking the two pieces of firmware as examples, two or more pieces of firmware may be stored in the SSD 107.

The boot loader 201 is a program that is loaded first by the initialization program, which is called BIOS, to be executed by the CPU 101 when the image forming apparatus 1 is activated.

In addition to firmware that is executed at a time of an ordinary operation, the image forming apparatus 1 is provided with another instance of firmware that is executed at a time of a firmware update. The ordinary firmware 210 is the firmware that is executed by the CPU 101 at the time of an ordinary operation. The update firmware 220 is the firmware that is executed by the CPU 101 at the time of a firmware update.

The ordinary firmware 210 includes an OS 211 and an ordinary application program 212. The OS 211 is an operating system that performs, for example, operation control of the hardware constituting the controller 3. The ordinary application program 212 is an executable program by which the image forming apparatus 1 is controlled at the time of an ordinary operation to thereby achieve execution of various jobs such as copying and printing. Moreover, the ordinary application program 212 also includes a function of updating the update firmware 220 at the time of a firmware update. The OS 211 is an example of a common part that is included in the ordinary firmware 210.

The update firmware 220 includes an OS 221 and an update application program 222. The OS 221 is an operating system and is stored in a different region in the SSD 107, but is the same executable program as the OS 211. The update application program 222 is an executable program that has a function of updating the ordinary firmware 210 at the time of a firmware update. A size of the update application program 222 is smaller than that of the ordinary application program 212, and it is thereby possible to save storage capacity of the SSD 107. The OS 221 is an example of a common part that is included in the update firmware 220.

Moreover, an electronic signature by which validity is verified is added to each of the executable programs. The security chip 108 is able to verify validity of the executable program with use of electronic certification. An electronic signature 202 is an electronic signature by which the boot loader 201 is verified. An electronic signature 213 is an electronic signature by which the OS 211 is verified. An electronic signature 214 is an electronic signature by which the ordinary application program 212 is verified. An electronic signature 223 is an electronic signature by which the OS 221 is verified. An electronic signature 224 is an electronic signature by which the update application program 222 is verified.

Figure 3A:
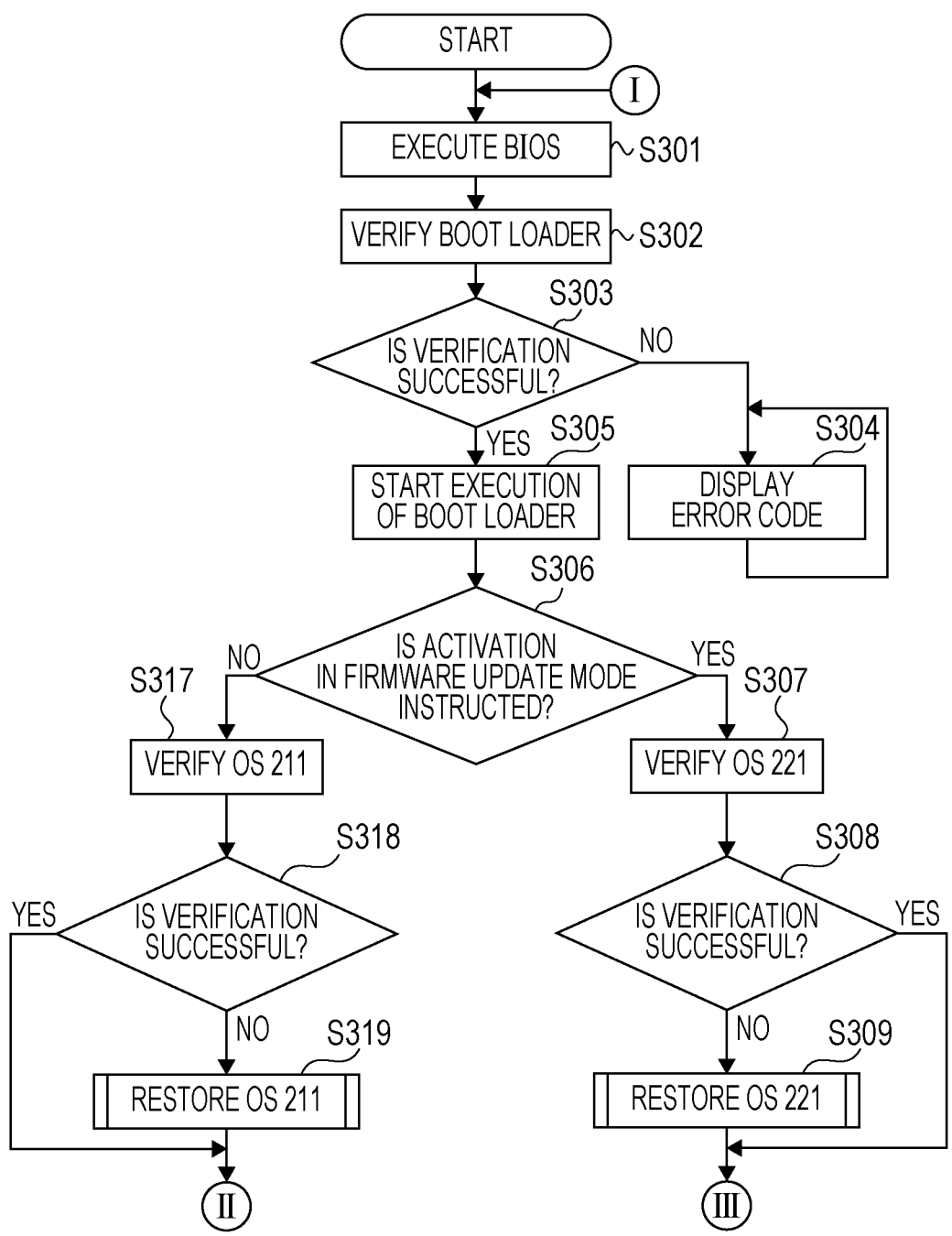
FIGS. 3A to 3C include a flowchart illustrating an example of information processing of a first embodiment.
Figure 3B:
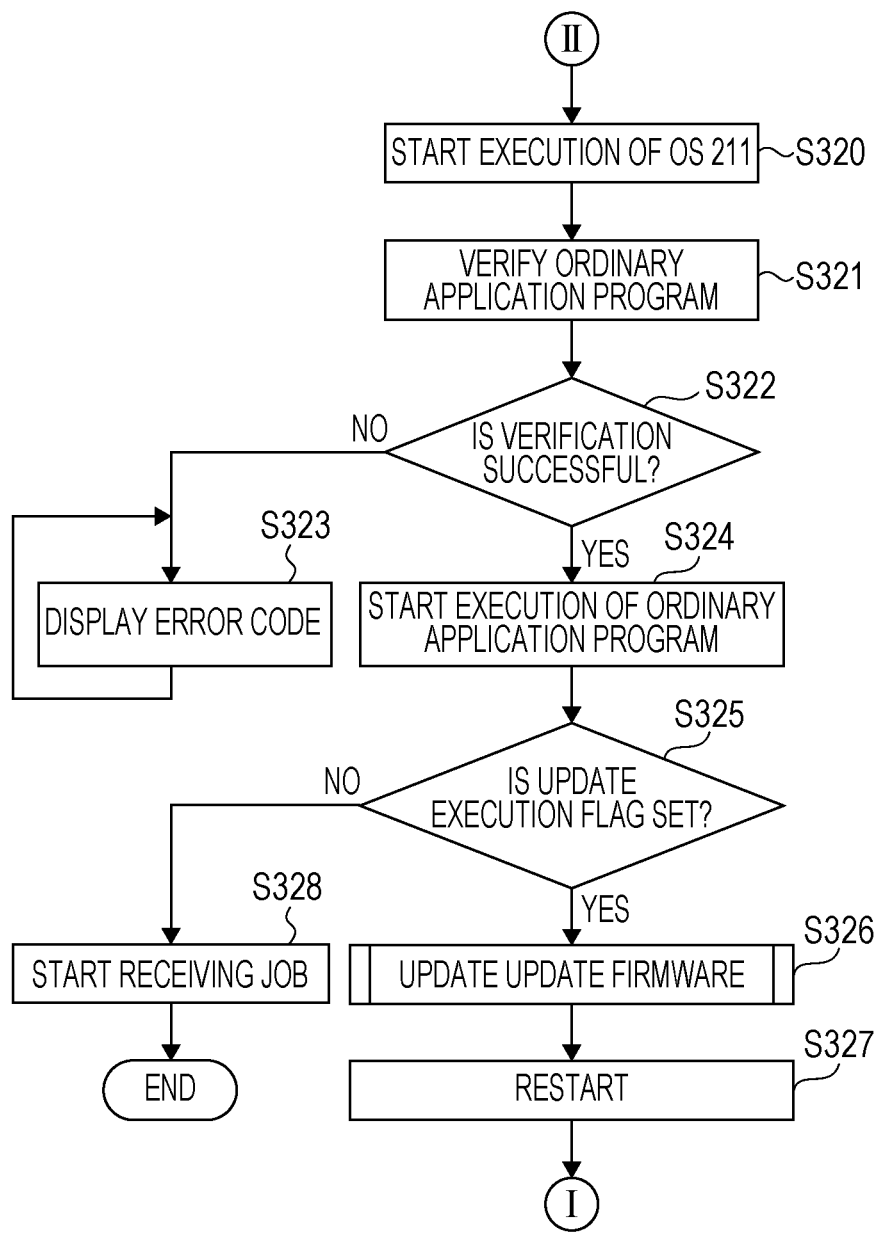
Figure 3C:
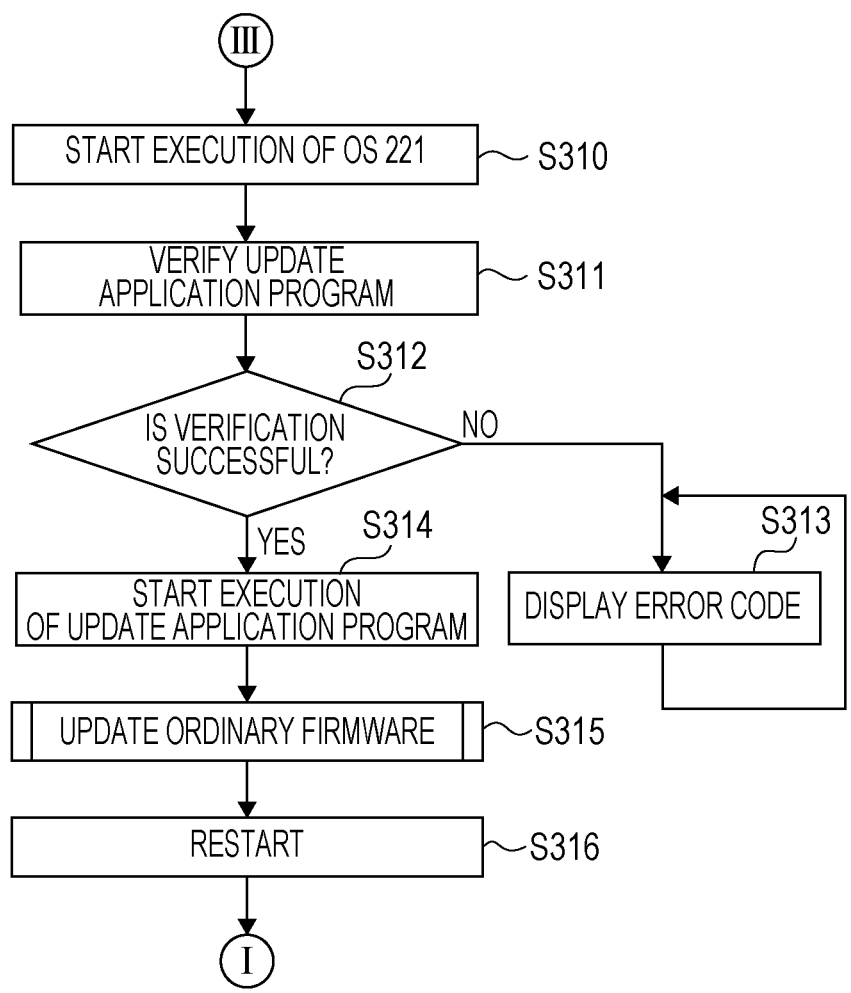

FIGS. 3A to 3C include a flowchart illustrating an example of information processing of the first embodiment, which is related to activation of the image forming apparatus 1 and firmware update associated with the activation. When a user turns on power of the image forming apparatus 1, the CPU 101 starts the processing of the flowchart.

First, at S301, the CPU 101 starts execution of the BIOS which is the initialization program stored in the boot ROM 105. Subsequent processing S302 to S305 is achieved by the CPU 101 executing the BIOS.

At S302, by executing the BIOS, the CPU 101 loads the boot loader 201 stored in the SSD 107 into the memory 103 and verifies validity. This is achieved by the security chip 108 verifying the electronic signature 202.

At S303, on the basis of a result of the verification of the boot loader 201, the CPU 101 determines whether or not the verification is successful. When the verification is successful and the boot loader 201 is valid, the CPU 101 proceeds to S305, and when the boot loader 201 is not valid, the CPU 101 proceeds to S304.

Figure 4A:
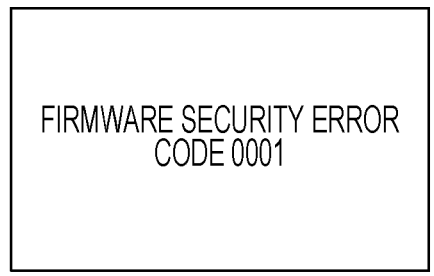
FIGS. 4A to 4D are views each illustrating an example of screen display.

At S304, that is, when the result of the verification of the boot loader 201 is not valid, the CPU 101 displays an error code on the display panel of the operation unit 5 and interrupts the activation of the image forming apparatus 1. FIG. 4A is a view illustrating an example of screen display in a case where the verification of the boot loader 201 is not successful.

On the other hand, at S305, that is, when the result of the verification of the boot loader 201 is valid, the CPU 101 starts execution of the boot loader 201 loaded into the memory 103. Subsequent processing S306 to S310 or processing S306 to S320 is achieved by the CPU 101 executing the boot loader 201.

At S306, the CPU 101 determines whether or not activation in a firmware update mode is instructed. A user is able to instruct the image forming apparatus 1 to perform the activation in the firmware update mode by operating an operation switch of the operation unit 5. When the activation in the firmware update mode is instructed, the CPU 101 proceeds to S307. When the activation in the firmware update mode is not instructed, the CPU 101 proceeds to S317.

At S307, that is, when the activation in the firmware update mode is instructed, the CPU 101 loads the OS 221 from the SSD 107 into the memory 103 and verifies validity. This is achieved by the security chip 108 verifying the electronic signature 223.

At S308, on the basis of a result of the verification, the CPU 101 determines whether or not the verification is successful. When the verification is successful and the OS 221 is valid, the CPU 101 proceeds to S310. When the OS 221 is not valid, the CPU 101 proceeds to S309.

At S309, that is, when the OS 221 is not valid, the CPU 101 executes restoration of the OS 221. When the restoration is completed, the CPU 101 proceeds to S310.

Figure 5A:
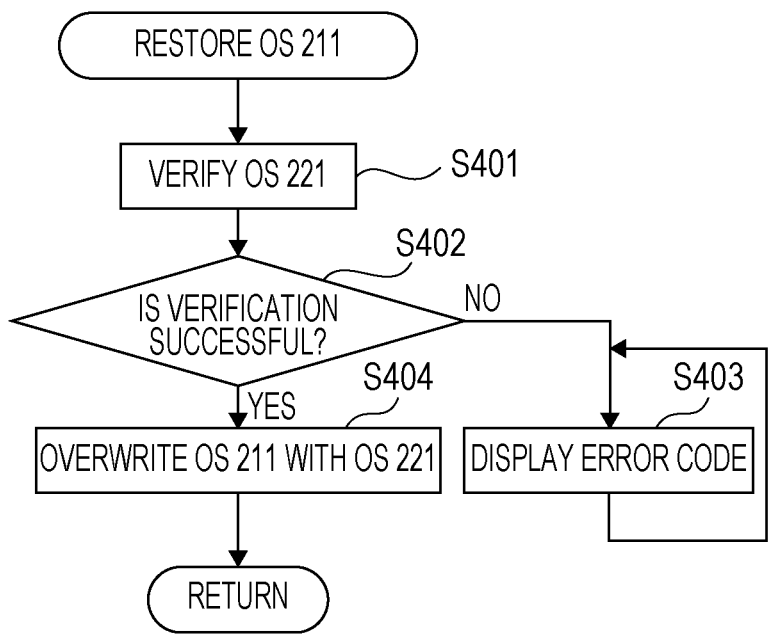
FIGS. 5A and 5B are flowcharts each illustrating an example of information processing related to restoration.
Figure 5B:
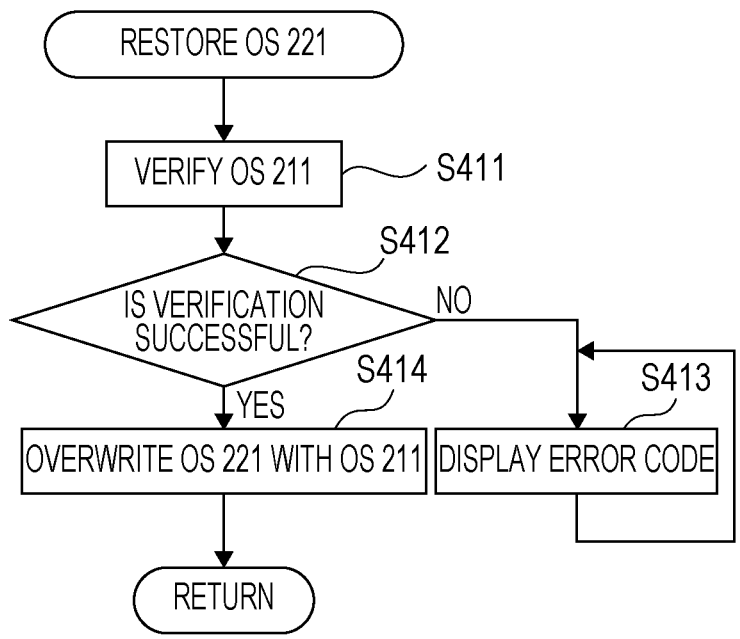

Details of the restoration of the OS 221 will be described with reference to a flowchart of FIG. 5B.

At S411, the CPU 101 verifies validity of the OS 211. This is achieved by the security chip 108 verifying the electronic signature 213. Since the OS 211 is used for restoring the OS 221 in the image forming apparatus 1, the validity of the OS 211 is required to be verified in advance.

At S412, on the basis of a result of the verification of the OS 211, the CPU 101 determines whether or not the verification is successful. When the verification is successful and the OS 211 is valid, the CPU 101 proceeds to S414. Otherwise, the CPU 101 proceeds to S413.

Figure 4B:
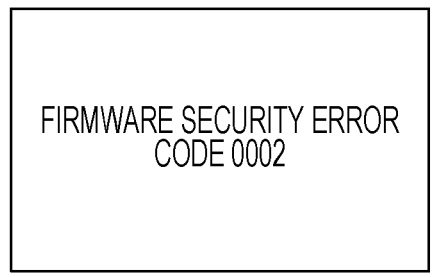
Figure 4C:
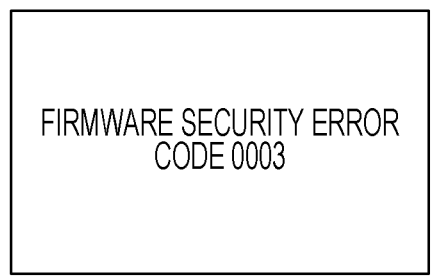

At S413, that is, when the OS 211 is not valid, the CPU 101 displays, on the display panel of the operation unit 5, an error code which indicates that the update firmware 220 is not valid, and interrupts the activation. This is because, in a case where the OS 211 is not valid, it is difficult to restore the OS 221. FIG. 4C is a view illustrating an example of screen display which indicates that the update firmware 220 is not valid.

On the other hand, when the OS 211 is valid, at S414, the CPU 101 overwrites the contents of the OS 221 in the SSD 107 with that of the OS 211. Thereby, the OS 221 is restored.

Then, the CPU 101 ends processing of the flowchart of restoring the OS 221 and returns to the former processing.

Hereinafter, an operation of the CPU 101 will be described with reference to the flowchart of FIGS. 3A to 3C again.

At S310, in FIG. 3C, the CPU 101 starts execution of the OS 221 and proceeds to S311. Subsequent processing S311 to S314 is achieved by the CPU 101 executing the OS 221.

At S311, the CPU 101 loads the update application program 222 into the memory 103 and verifies validity. This is achieved by the security chip 108 verifying the electronic signature 224.

At S312, on the basis of a result of the verification, the CPU 101 determines whether or not the verification is successful. When the verification is successful and the update application program 222 is valid, the CPU 101 proceeds to S314. When the update application program 222 is not valid, the CPU 101 proceeds to S313.

At S313, that is, when the update application program 222 is not valid, the CPU 101 displays, on the display panel of the operation unit 5, the error code which indicates that the update firmware 220 is not valid, and interrupts the activation. FIG. 4C is the view illustrating the example of the screen display which indicates that the update firmware 220 is not valid.

On the other hand, when the update application program 222 is valid, at S314, the CPU 101 starts execution of the update application program 222. Subsequent processing S315 and S316 is achieved by the CPU 101 executing the update application program 222.

At S315, the CPU 101 executes update of the ordinary firmware 210.

Figure 6A:
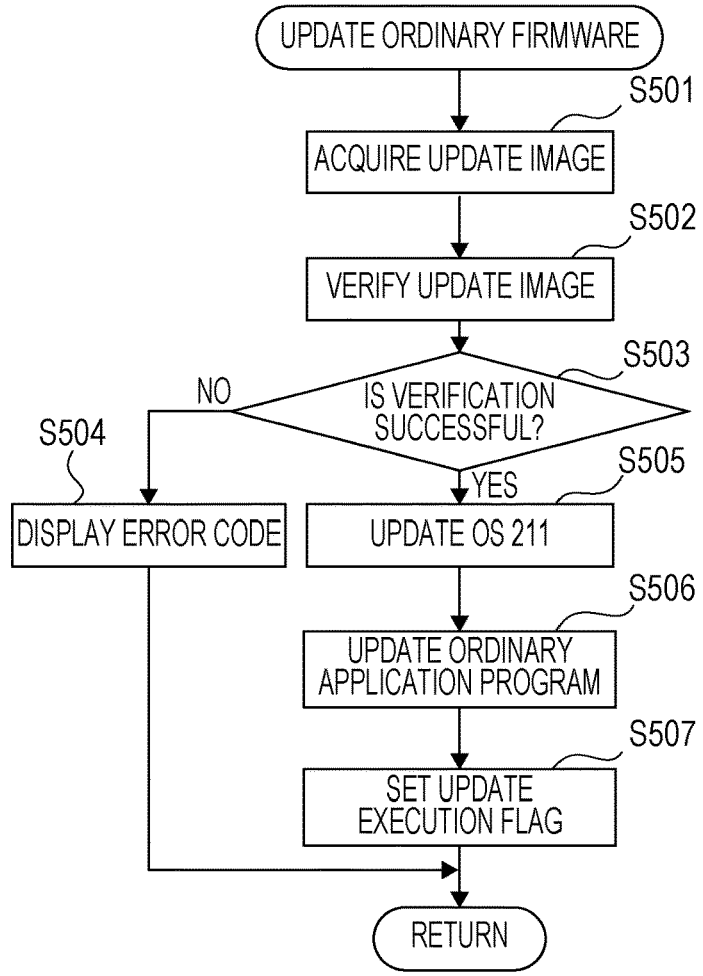
FIGS. 6A and 6B are flowcharts each illustrating an example of information processing related to firmware update.

Details of the update of the ordinary firmware 210 will be described with reference to a flowchart of FIG. 6A.

At S501, the CPU 101 receives an update image, which includes new firmware of the image forming apparatus 1, from the LAN 7 via the network interface 110. The CPU 101 stores the acquired update image in the hard disk drive 6 that is a temporary storage location of data.

Figure 7:
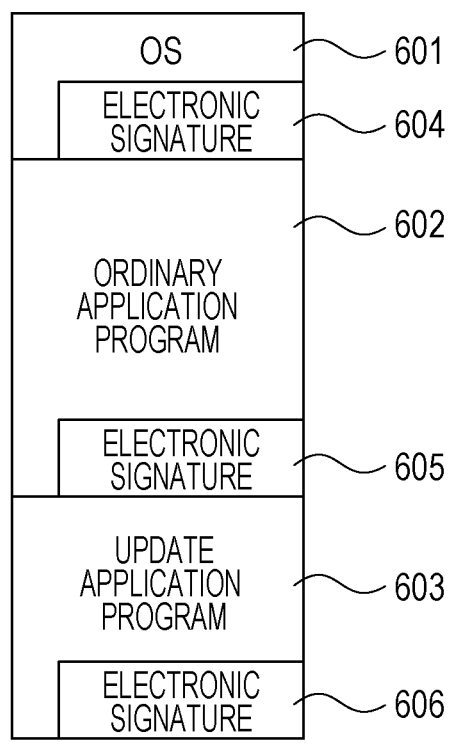
FIG. 7 is a view illustrating an example of an update image.

FIG. 7 is a view illustrating a configuration of the update image. The update image includes an OS 601, an ordinary application program 602, and an update application program 603 which are programs executable by the CPU 101. Moreover, an electronic signature by which validity is verified is added to each of the executable programs. An electronic signature 604, an electronic signature 605, and an electronic signature 606 are added to the OS 601, the ordinary application program 602, and the update application program 603, respectively. Each validity is able to be verified by verifying a corresponding one of the electronic signatures by the security chip 108.

At S502, the CPU 101 verifies validity of the acquired update image. This is achieved by the security chip 108 verifying the electronic signature 604, the electronic signature 605, and the electronic signature 606. The verification is successful only in a case where it is confirmed that all of the electronic signatures are valid.

At S503, on the basis of a result of the verification as to the validity of the update image, the CPU 101 determines whether or not the verification is successful. When the verification is successful and it is determined that the update image is valid, the CPU 101 proceeds to S505. Otherwise, the CPU 101 proceeds to S504.

Figure 4D:

At S504, that is, when it is determined that the update image is not valid, the CPU 101 displays, on the display panel of the operation unit 5, an error code which indicates that firmware update is not able to be executed. FIG. 4D is a view illustrating an example of screen display which indicates that firmware update is not able to be executed. After displaying the error code, the CPU 101 ends processing of the flowchart of the update of the ordinary firmware 210.

On the other hand, when it is determined that the update image is valid, at S505, the CPU 101 updates the OS 211 on the SSD 107 with use of the OS 601 included in the update image.

At S506, the CPU 101 updates the ordinary application program 212 on the SSD 107 with use of the ordinary application program 602.

At S507, the CPU 101 sets an update execution flag, which indicates that the update firmware 220 is required to be updated, in the SRAM 104, and ends the processing of the flowchart of the update of the ordinary firmware 210.

Hereinafter, the operation of the CPU 101 will be described with reference to the flowchart of FIGS. 3A to 3C again.

At S316, in FIG. 3C, the CPU 101 restarts the image forming apparatus 1. Thereby, the CPU 101 is to return to S301 and execute the flowchart of FIGS. 3A to 3C from the beginning again.

Hereinafter, processing in a case where the activation in the firmware update mode is not instructed at S306 will be described.

At S317, the CPU 101 loads the OS 211 from the SSD 107 into the memory 103 and verifies validity. This is achieved by the security chip 108 verifying the electronic signature 213.

At S318, on the basis of a result of the verification, the CPU 101 determines whether or not the verification is successful. When the verification is successful and the OS 211 is valid, the CPU 101 proceeds to S320. When the OS 211 is not valid, the CPU 101 proceeds to S319.

At S319, that is, when the OS 211 is not valid, the CPU 101 executes restoration of the OS 211. When the restoration is completed, the CPU 101 proceeds to S320.

Details of the restoration of the OS 211 will be described with reference to a flowchart of FIG. 5A.

At S401, the CPU 101 verifies validity of the OS 221. This is achieved by the security chip 108 verifying the electronic signature 223. Since the OS 221 is used for restoring the OS 211 in the image forming apparatus 1, the validity of the OS 221 is required to be verified in advance.

At S402, on the basis of a result of the verification of the OS 221, the CPU 101 determines whether or not the verification is successful. When the verification is successful and the OS 221 is valid, the CPU 101 proceeds to S404. Otherwise, the CPU 101 proceeds to S403.

At S403, that is, when the OS 221 is not valid, the CPU 101 displays, on the display panel of the operation unit 5, an error code which indicates that the ordinary firmware 210 is not valid, and interrupts the activation. This is because, in a case where the OS 221 is not valid, it is difficult to restore the OS 211. FIG. 4B is a view illustrating an example of screen display which indicates that the ordinary firmware 210 is not valid.

On the other hand, when the OS 221 is valid, at S404, the CPU 101 overwrites the contents of the OS 211 in the SSD 107 with that of the OS 221. Thereby, the OS 211 is restored.

Then, the CPU 101 ends processing of the flowchart of restoring the OS 211 and returns to the former processing.

Hereinafter, the operation of the CPU 101 will be described with reference to the flowchart of FIGS. 3A to 3C again.

At S320, in FIG. 3B, the CPU 101 starts execution of the OS 211 and proceeds to S321. Subsequent processing S321 to S324 is achieved by the CPU 101 executing the OS 211.

At S321, the CPU 101 loads the ordinary application program 212 into the memory 103 and verifies validity. This is achieved by the security chip 108 verifying the electronic signature 214.

At S322, on the basis of a result of the verification, the CPU 101 determines whether or not the verification is successful. When the verification is successful and the ordinary application program 212 is valid, the CPU 101 proceeds to S324. When the ordinary application program 212 is not valid, the CPU 101 proceeds to S323.

At S323, that is, when the ordinary application program 212 is not valid, the CPU 101 displays, on the display panel of the operation unit 5, the error code which indicates that the ordinary firmware 210 is not valid, and interrupts the activation. FIG. 4B is the view illustrating the example of the screen display which indicates that the ordinary firmware 210 is not valid.

On the other hand, when the ordinary application program 212 is valid, at S324, the CPU 101 starts execution of the ordinary application program 212. Subsequent processing S325 to S328 is achieved by the CPU 101 executing the ordinary application program 212.

At S325, the CPU 101 determines whether or not an update execution flag which indicates that the update firmware 220 is required to be updated is set in the SRAM 104. When the update execution flag is set, the CPU 101 proceeds to S326. When the update execution flag is not set, the CPU 101 proceeds to S328.

At S326, that is, when the update execution flag is set, the CPU 101 executes update of the update firmware 220 and proceeds to S327.

Figure 6B:
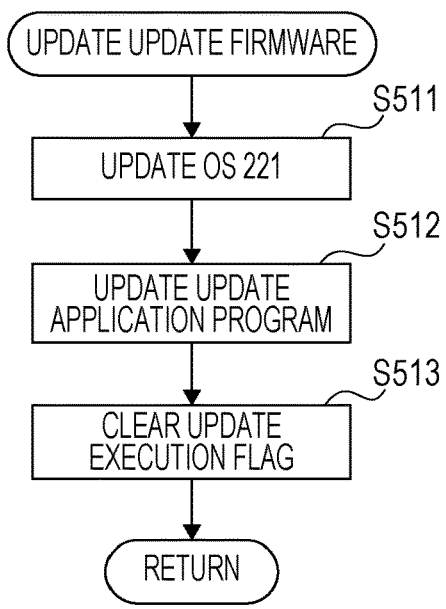

Details of the update of the update firmware 220 will be described with reference to a flowchart of FIG. 6B.

At S511, the CPU 101 updates the OS 221 on the SSD 107 with use of the OS 601 that is included in the update image stored in the hard disk drive 6.

At S512, the CPU 101 updates the update application program 222 on the SSD 107 with use of the update application program 603.

At S513, the CPU 101 clears the update execution flag in the SRAM 104, and ends processing of the flowchart of the update of the update firmware 220.

Hereinafter, the operation of the CPU 101 will be described with reference to the flowchart of FIGS. 3A to 3C again.

At S327, in FIG. 3B, the CPU 101 restarts the image forming apparatus 1. Thereby, the CPU 101 is to return to S301 and execute the flowchart of FIGS. 3A to 3C from the beginning again.

On the other hand, at S328, the CPU 101 starts receiving a job in the image forming apparatus 1, and the activation of the image forming apparatus 1 is thereby completed.

As above, according to the image forming apparatus 1 that is described in the present embodiment, validity of an important portion in firmware is verified at a time of activation of the image forming apparatus 1, and, in a case where tampering is detected, restoration is automatically performed, thus making it possible to reduce downtime of the image forming apparatus 1.

Moreover, a part of different firmware such as the OS 221, which is held for a function of firmware update, is used also as firmware in a normal state to restore firmware. It is thereby possible to suppress an increase in capacity of a nonvolatile storage medium such as the SSD 107 and reduce cost of achieving a function of restoring firmware.

Second Embodiment

In the first embodiment, the CPU 101 executes the boot loader 201 to thereby verify the OS 211 or the OS 221 and, furthermore, performs restoration. However, the restoration is not necessarily executed by the boot loader 201, and may be achieved by any program as long as the program is executed after the boot loader 201.

In the present embodiment, a configuration in which the restoration is performed by executing the ordinary application program 212 or the update application program 222 will be described as an example.

Figure 8A:
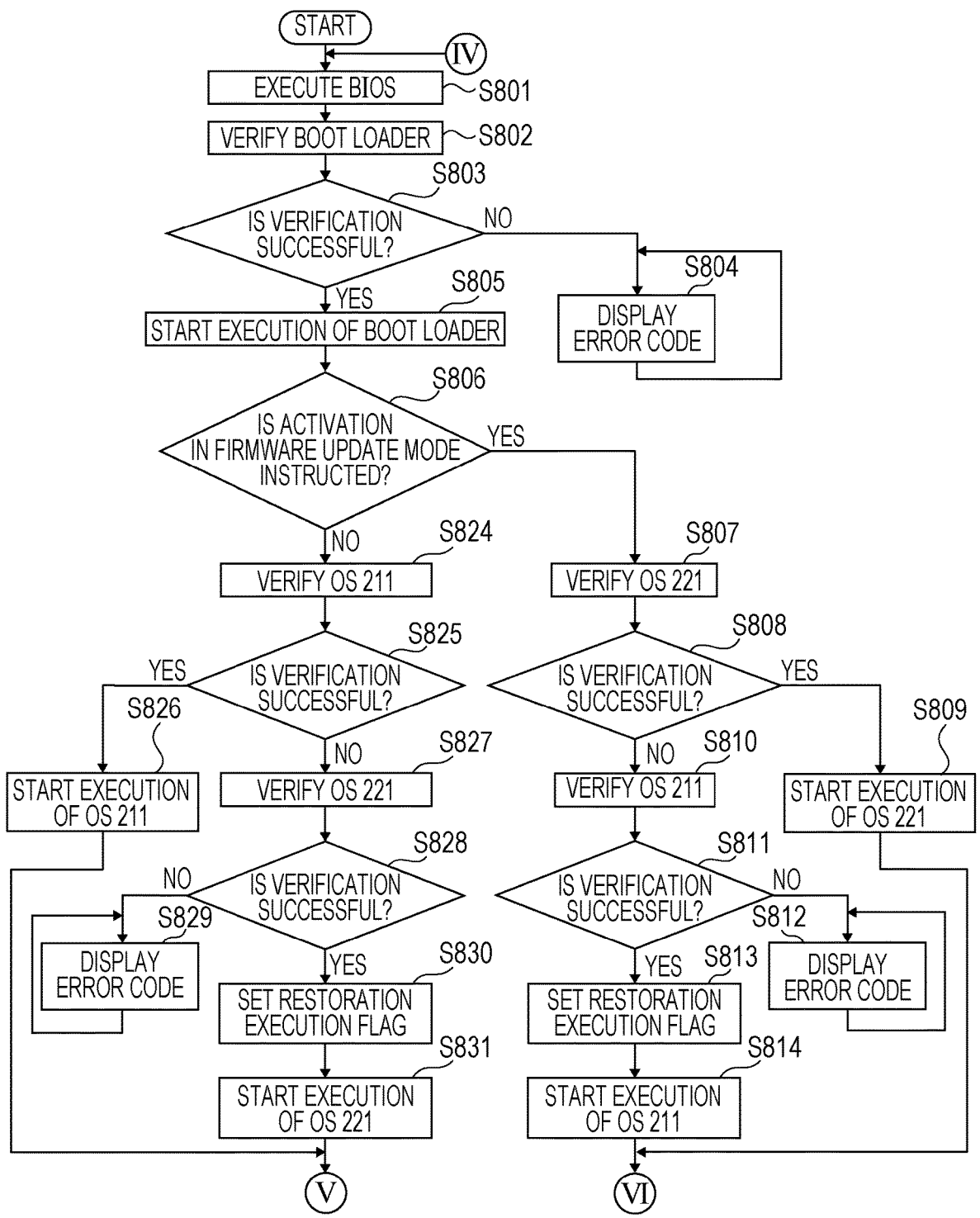
FIGS. 8A to 8C include a flowchart illustrating an example of information processing of a second embodiment.
Figure 8B:
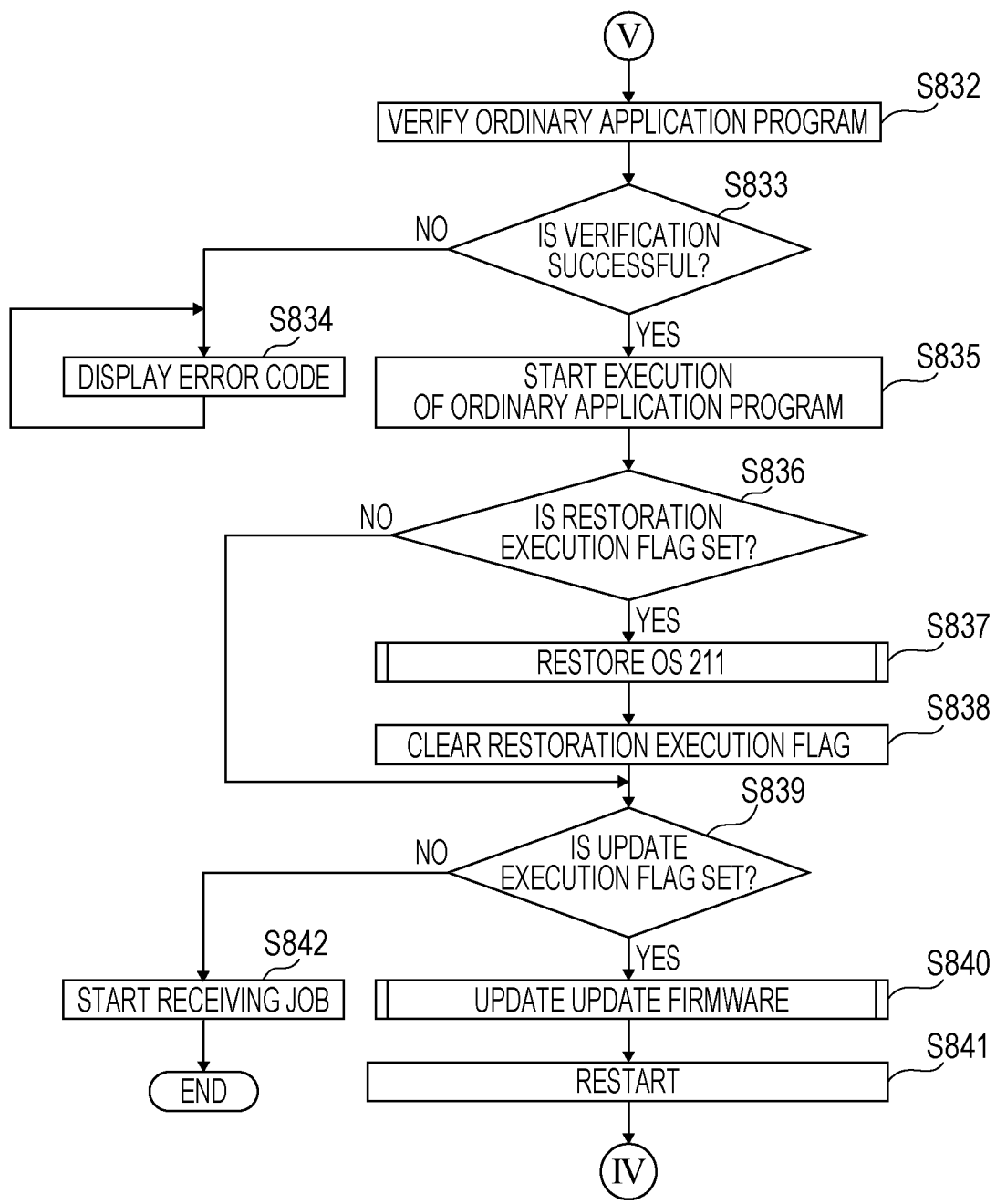
Figure 8C:
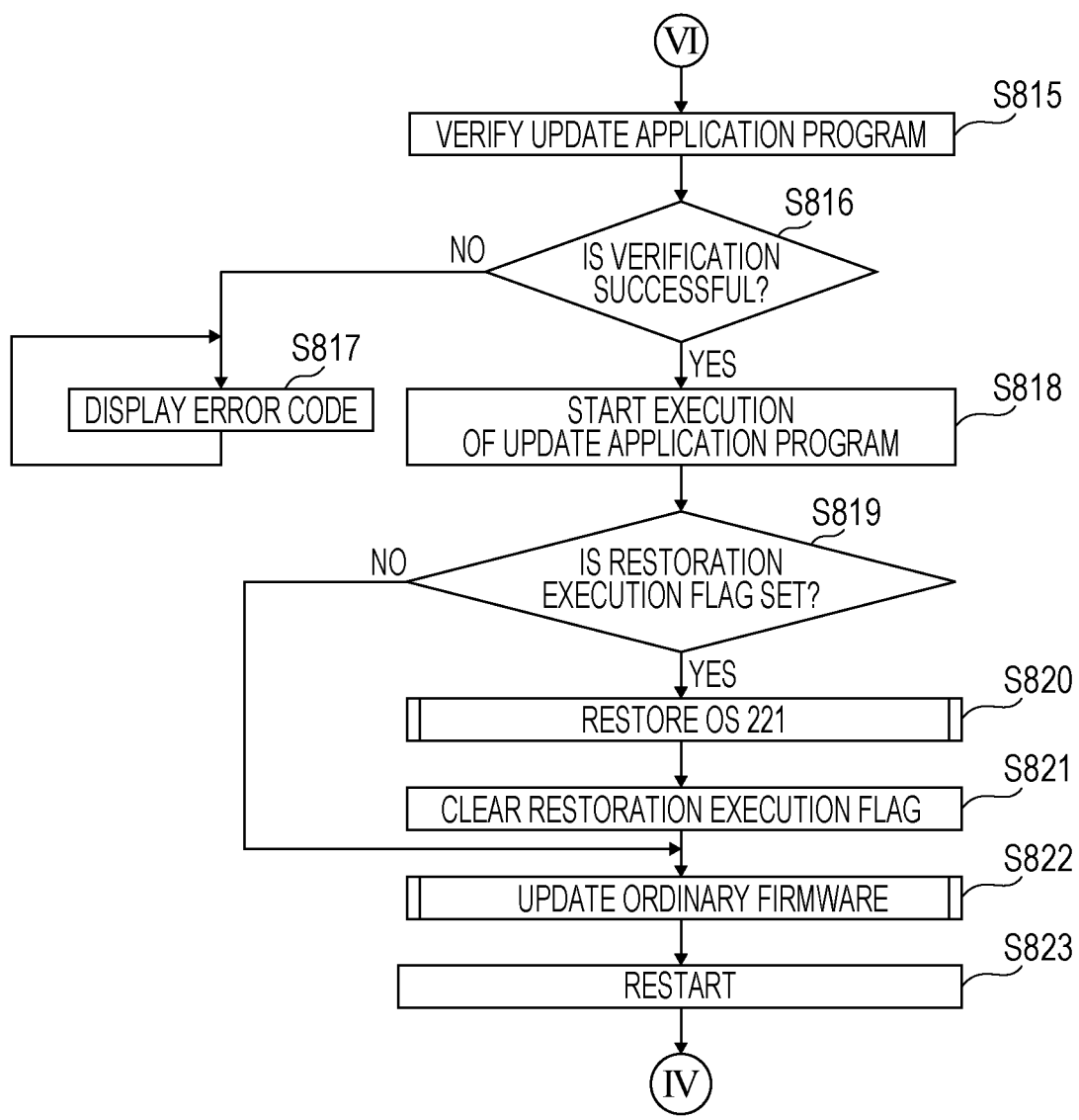

FIGS. 8A to 8C include a flowchart illustrating an example of information processing of the second embodiment 2, which is related to activation of the image forming apparatus 1 and firmware update associated with the activation. When a user turns on the power of the image forming apparatus 1, the CPU 101 starts the processing of the flowchart.

Note that, the information processing of the image forming apparatus 1 of the present embodiment is the same as that of the first embodiment, except for a part thereof. In description below, only a point different from that of the first embodiment will be described and description for the same point will be omitted.

First, processing S801 to S808 of FIG. 8A is the same as the processing from S301 to S308 of FIG. 3A, so that detailed description thereof will be omitted.

When verification of the OS 221 is successful at S808, the CPU 101 proceeds to S809. At S809, the CPU 101 starts execution of the OS 221. Then, the CPU 101 proceeds to S815. Subsequent processing S815 to S818 is achieved by the CPU 101 executing the OS 221.

On the other hand, when the verification of the OS 221 is not successful at S808, the CPU 101 proceeds to S810.

At S810, the CPU 101 loads the OS 211 into the memory 103 and verifies validity. This is achieved by the security chip 108 verifying the electronic signature 213.

At S811, the CPU 101 makes determination on the basis of a result of the verification. When the verification is successful and the OS 211 is valid, the CPU 101 proceeds to S813. When the OS 211 is not valid, the CPU 101 proceeds to S812.

At S812, that is, when the OS 211 is not valid, the CPU 101 displays, on the display panel of the operation unit 5, the error code which indicates that the update firmware 220 is not valid, and interrupts the activation. FIG. 4C is the view illustrating the example of the screen display which indicates that the update firmware 220 is not valid.

At S813, that is, when the OS 211 is valid, the CPU 101 sets a restoration execution flag, which indicates restoration processing is required to be executed, in the SRAM 104.

At S814, the CPU 101 starts execution of the OS 211. In this case, subsequent processing S815 to S818 is achieved by the CPU 101 executing the OS 211. Note that, as described above, the OS 211 and the OS 221 are the same programs that are stored in different regions in the SSD 107, and processing to be executed is the same.

The processing S815 to S818 is the same as the processing S311 to S314 of FIG. 3C, so that detailed description thereof will be omitted.

Subsequent processing S819 to S823 is achieved by the CPU 101 executing the update application program 222.

At S819, the CPU 101 determines whether or not the restoration execution flag is set in the SRAM 104. When the restoration execution flag is set, the CPU 101 proceeds to S820. When the restoration execution flag is not set, the CPU 101 proceeds to S822.

At S820, that is, when the restoration execution flag is set in the SRAM 104, the CPU 101 executes processing of restoring the OS 221.

At S821, the CPU 101 clears the restoration execution flag in the SRAM 104. Processing S822 and S823 is the same as the processing S315 and S316 of FIG. 3C, so that detailed description thereof will be omitted.

Next, processing in a case where activation in the firmware update mode is not instructed at a time of activation will be described.

Processing S824 and S825 is the same as the processing S317 and S318 of FIG. 3A.

When verification of the OS 211 is successful at S825, the CPU 101 proceeds to S826. At S826, the CPU 101 starts execution of the OS 211. Then, the CPU 101 proceeds to S832. Subsequent processing S832 to S835 is achieved by the CPU 101 executing the OS 211.

On the other hand, when the verification of the OS 211 is not successful at S825, the CPU 101 proceeds to S827.

At S827, the CPU 101 loads the OS 221 into the memory 103 and verifies validity. This is achieved by the security chip 108 verifying the electronic signature 223.

At S828, on the basis of a result of the verification, the CPU 101 makes determination. When the verification is successful and the OS 221 is valid, the CPU 101 proceeds to S830. When the OS 221 is not valid, the CPU 101 proceeds to S829.

At S829, that is, when the OS 221 is not valid, the CPU 101 displays, on the display panel of the operation unit 5, the error code which indicates that the ordinary firmware 210 is not valid, and interrupts the activation. FIG. 4B is the view illustrating the example of the screen display which indicates that the ordinary firmware 210 is not valid.

At S830, that is, when the OS 221 is valid, the CPU 101 sets a restoration execution flag, which indicates that restoration processing is required to be executed, in the SRAM 104.

At S831, the CPU 101 starts execution of the OS 221. In this case, the subsequent processing S832 to S835 is achieved by the CPU 101 executing the OS 221.

The processing S832 to S835 is the same as the processing S321 to S324 of FIG. 3B, so that detailed description thereof will be omitted.

Subsequent processing S836 to S841 is achieved by the CPU 101 executing the ordinary application program 212.

At S836, the CPU 101 determines whether or not the restoration execution flag is set in the SRAM 104. When the restoration execution flag is set, the CPU 101 proceeds to S837. When the restoration execution flag is not set, the CPU 101 proceeds to S839.

At S837, that is, when the restoration execution flag is set in the SRAM 104, the CPU 101 executes processing of restoring the OS 211.

At S838, the CPU 101 clears the restoration execution flag in the SRAM 104. Processing S839 to 5842 is the same as the processing S325 to S328 of FIG. 3B, so that detailed description thereof will be omitted.

As above, according to the image forming apparatus 1 that is described in the present embodiment, restoration of the OS 211 or the OS 221 is not necessarily executed by the boot loader 201. A configuration in which the restoration is executed by the ordinary application program 212 or the update application program 222 as in the present embodiment may be provided. The restoration may be executed by any program as long as the program is executed after the boot loader 201, and an effect equivalent to that of the first embodiment is able to be attained.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

As above, examples of embodiments of the disclosure have been described in detail, but the disclosure is not limited to such specific embodiments.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-180330, filed Sep. 26, 2018, which is hereby incorporated by reference herein in its entirety.

What is claimed is:

1. A data processing apparatus comprising:
a storage unit that stores a first operating system (OS), a first application program executed after the first OS is executed, a second OS, and a second application program executed after the second OS is executed; and
at least one processor configured to, in a first activation mode, verify the first OS, execute the verified first OS, and then execute the first application program, and, in a second activation mode, execute the second OS, and then execute the second application program,
wherein the at least one processor is further configured to restore the first OS, in a case where it is determined on the verification of the first OS that the first OS is not valid, by overwriting at least a part of the first OS which is not valid with at least part of the second OS.

2. The data processing apparatus according to claim 1, wherein the at least one processor is configured to verify, in the case where it is determined on the verification of the first OS that the first OS is not valid, the second OS, and to restore the first OS by overwriting at least a part of the first OS which is not valid with at least part of the verified second OS.

3. The data processing apparatus according to claim 1, wherein the data processing apparatus that is activated in the first activation mode executes at least a job of copying or printing, and wherein the data processing apparatus that is activated in the second activation mode does not execute the job of the copying nor the printing.

4. The data processing apparatus according to claim 1, wherein the processor is configured to update the second OS and the second application program in accordance with the first application program, and
wherein the processor is configured to update the first OS and the first application program in accordance with the second application program.

5. The data processing apparatus according to claim 4, wherein the first application program does not verify the second OS nor the second application program in an update data before updating the second OS and the second application program, and
wherein the second application program verifies the first OS and the first application program in the update data before updating the first OS and the first application program.

6. The data processing apparatus according to claim 1, wherein the at least one processor is further configured to, in the second activation mode, verify the second OS, execute the verified second OS, and then execute the second application program,
wherein the at least one processor is further configured to restore the second OS, in a case where it is determined on the verification of the second OS that the second OS is not valid, by overwriting at least a part of the second OS which is not valid with use of at least part of the first OS.

7. The data processing apparatus according to claim 6, wherein the at least one processor is further configured to verify, in the case where it is determined on the verification of the second OS that the second OS is not valid, the first OS, and to restore the second OS by overwriting the part of the second OS which is not valid with a part of the verified first OS.

8. A date processing apparatus comprising:
a storage unit that stores a first operating system (OS) and a second operating system (OS) which is used to restore the first OS by overwriting at least a part of the first OS which is not valid with at least part of the second OS,
wherein at least one processor is configured:
to acquire update data which is used to updated the first OS; and
to update the second OS with the update data.

9. The data processing apparatus according to claim 8, further comprising:
a storage unit that further stores an application program that is executed after the second OS is executed,
wherein the at least one processor is configured to acquire the update data by executing the application program.

10. The data processing apparatus according to claim 9, wherein the at least one processor is configured to restore the second OS by overwriting at least a part of the second OS which is not valid with at least a part of the first OS.

11. The data processing apparatus according to claim 10, wherein the at least one processor is configured:
restore the updated second OS by overwriting at least a part of the updated second OS which is not valid with at least part of the updated first OS.

12. The data processing apparatus according to claim 8, wherein the at least one processor is configured to update the first OS with the update data.

13. The data processing apparatus according to claim 8, wherein the at least one processor is configured:

to set an update execution flag after the updating the first OS, and to update the second OS in a case that the update execution flag is set.

14. The data processing apparatus according to claim 8, further comprising:

the storage unit that further stores a boot loader that loads the first OS, wherein the at least one processor is configured to restore the first OS by executing the boot loader.

15. The data processing apparatus according to claim 8, wherein the at least one processor is configured:

restore the updated first OS by overwriting at least a part of the updated first OS which is not valid with at least part of the updated second OS.

16. The data processing apparatus according to claim 8, wherein the at least one processor is configured:

restore the updated first OS by overwriting at least a part of the updated first OS which is not valid with at least part of the second OS.

17. The data processing apparatus according to claim 8, further comprising:

the storage unit that further stores a boot loader that loads both the first OS and the second OS.

* * * * *